TUNABLE RESONANT SYSTEM

Filed Oct. 29, 1945

INVENTOR
GUS W. WALLIN
BY Mueller, Dodds & Mason
ATTORNEY

Patented Feb. 7, 1950 2,496,321

UNITED STATES PATENT OFFICE 2,496,321

TUNABLE RESONANT SYSTEM

Gus W. Wallin, Chicago, Ill., assignor to Motorola, Inc., a corporation of Illinois Application October 29, 1945, Serial No. 625,145

6 Claims. (Cl. 178—44)

Figures 1A, 1B, 2:
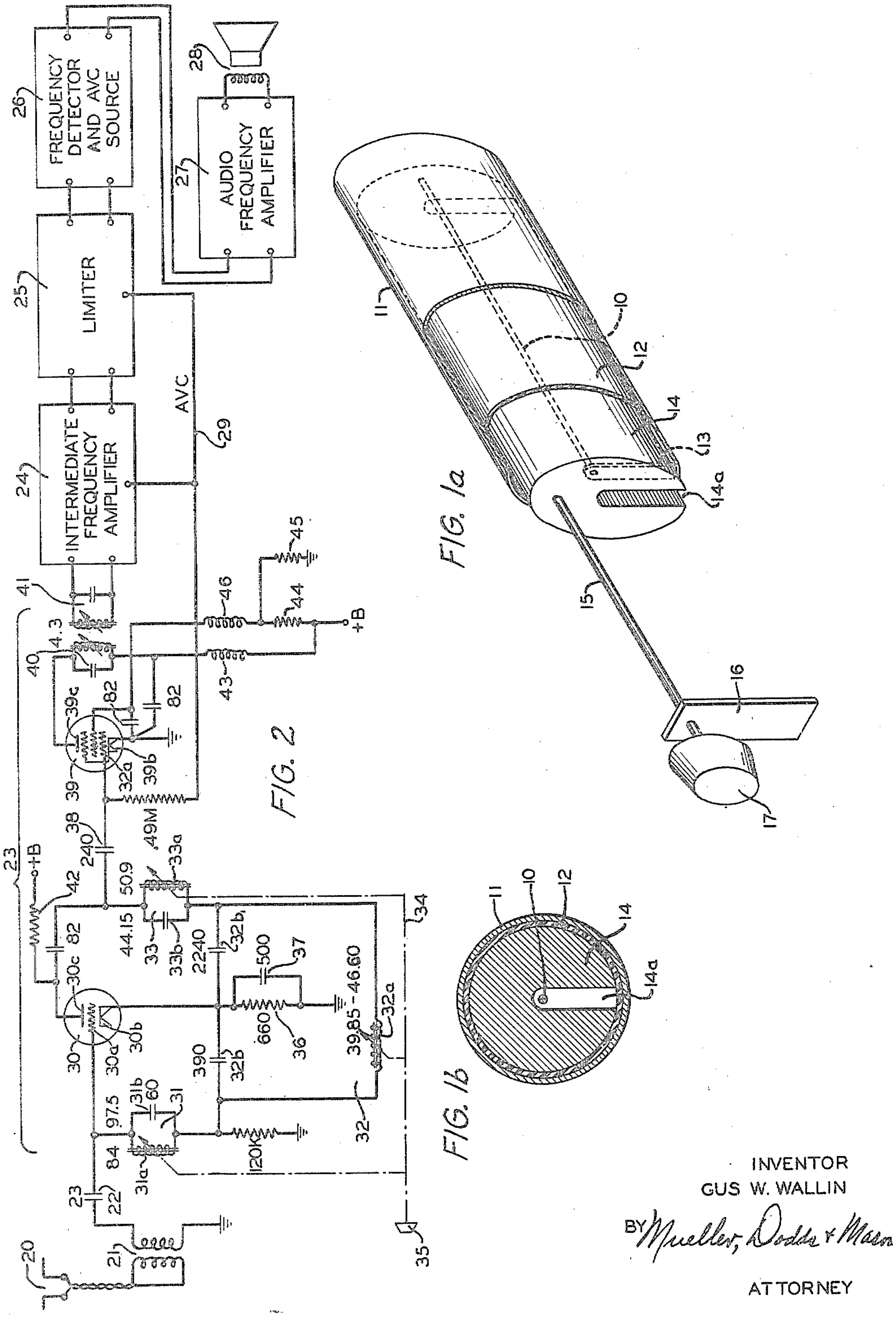

This invention relates to tunable resonant systems and, while it is of general application, it is particularly adapted for embodiment in ultra-high-frequency tunable systems for frequency modulation and television receivers.

In the design of radio receivers for progressively higher frequencies, for example for the frequency modulation band of 84–102 megacycles and for the television bands above and below the frequency modulation band, there is a serious problem in devising tunable signal-selecting systems having the desirable characteristics of conventional tuning systems designed for operation in the broadcast band. Among these desirable characteristics may be mentioned frequency stability under all usual operating conditions and high Q, that is low power factor, and resulting high values of gain and selectivity. Conventional tunable circuits comprise inductance and capacitance elements connected in parallel and whether such systems are tunable by adjustment of the capacitance or by adjustment of the inductance, as by the adjustment of the permeability of its magnetic circuit, they are not effective to procure these desirable characteristics when designed for operation in the ultra-high-frequency bands.

It is an object of the invention, therefore, to provide a new and improved ultra-high-frequency tunable resonant system which has one or more of the above-mentioned desirable characteristics of conventional tunable systems operating in the broadcast band.

It is another object of the invention to provide a new and improved ultra-high-frequency tunable resonant system which is simple and economical in construction and which is readily adjustable to tune the system over a range of frequencies without sacrificing the above-mentioned desirable characteristics.

In accordance with the invention, a resonant system tunable over a range of frequencies comprises a transmission line comprising at least two spaced conductors having distributed series inductance and distributed shunt capacitance and means for varying an electrical characteristic of the medium separating the conductors to adjust the distributed constants of the line and thereby adjust the resonant frequency of the system.

For a better understanding of the invention, together with other and further objects thereof, reference is had to the following description taken in connection with the accompanying drawings, while its scope will be pointed out in the appended claims.

Referring now to the drawings,

Fig. 1 is a perspective view, and Fig. 1*b* is a cross sectional view of a tunable resonant system embodying the invention; while Fig. 2 is a circuit diagram, partially schematic, of a complete double-superheterodyne receiver embodying the tunable resonant systems of the invention.

Referring now to Figs. 1*a* and 1*b* of the drawing, there is illustrated a resonant system embodying the invention and tunable over a range of frequencies. This system comprises a concentric transmission line including at least two spaced coaxial conductors having distributed series inductance and distributed shunt capacitance. Specifically, the line comprises a central conductor 10 and a coaxial cylindrical conductor 11 which may be in the form of a brass or copper tubing. A sleeve 12 of insulation material, such as molded thermoplastic resin is closely fitted inside of the cylindrical conductor 11. The conductor 11 is provided with a pair of axially spaced supporting arms 13 extending radially inward from the conductor and supporting the central conductor 10.

The resonant tunable system also includes means for varying an electrical characteristic, for example, the permeability or dielectric constant, or both, of the medium separating the conductors 10 and 11 to adjust the distributed constants of the line; that is, its distributed series inductance or distributed shunt capacitance, or both, thereby to adjust the resonant frequency of the system. This means may be in the form of a ferromagnetic core element 14 preferably formed of powdered iron molded in a thermoplastic binder. The core 14 is proportioned substantially to fill the space between the conductors 10 and 11, or between the conductor 10 and the insulating sleeve 12, and is slotted as at 14*a* in order to clear the radial supporting arms 13 when adjusted into and out of the concentric line. The tunable system also includes means for axially adjusting the core element 14 to adjust the resonant frequency of the system. This adjusting means may be of any conventional form, but there is shown by way of an example, a threaded rod 15 attached to the core 14 and having a threaded engagement with a fixed member 16 and provided with a manual adjusting knob 17 attached to the end thereof.

It is believed that the operation of the tunable system of the invention will be apparent to those skilled in the art from the foregoing description. In brief, as the ferromagnetic core element 14 is inserted into the concentric line comprising the conductors 10 and 11, the magnetic material thereof very materially increases the permeability of the space separating the conductors 10 and 11 and thereby substantially increases the distributed series inductance of the conductors 10 and 11. At the same time the thermoplastic binder of the core 14, which has a dielectric constant substantially greater than unity, increases the dielectric constant of the space separating the conductors 10 and 11 simultaneously to increase the distributed shunt capacitance. These two effects are cumulative to lower the natural resonant frequency of the line 10 and 11 as the core element 14 is inserted therein. Obviously, upon reverse adjustment of the core element 14, the distributed inductance and capacitance of the line is decreased to raise its natural resonant frequency. The core element 14 is preferably constructed to have an easy sliding fit within the insulation sleeve 12 but so that it substantially fills the space between the conductors 10 and 11, in order to obtain a maximum effect on the tuning range of the system. At the same time the slot 14*a* in the core 14 permits it to clear the supporting arms 13 on which is mounted the central conductor 10. It has been found that, with a tuning system of the type described, there may be obtained a Q of the order of 350 and a frequency stability of the order of 0.02% over a range of temperatures of from 0° C. to +50° C.

In Fig. 2 there is represented schematically a complete double-superheterodyne receiver embodying a heterodyne converter arranged in accordance with one feature of the invention and incorporating therein tunable systems of the type described above in connection with Figs. 1*a* and 1*b*. The receiver of Fig. 2 comprises an antenna system 20 coupled through a transformer 21 and a coupling condenser 22 to a frequency converter 23 arranged in accordance with a feature of the invention, as described hereinafter, and embodying the tunable system described above. The converter 23 is coupled to an intermediate-frequency amplifier 24 of one or more stages to which is connected in cascade a limiter 25, a frequency detector and AVC source 26, an audio-frequency amplifier 27 and a sound reproducer or loud speaker 28. An automatic amplification bias derived from the unit 26 is applied by way of an AVC circuit 29 to the control electrodes of one or more tubes of the stages 23 and 24 to maintain the signal input to the limiter unit 25 within a narrow range for a wide range of received signal intensities.

It is believed that the general operation of the super-heterodyne receiver described will be apparent from the foregoing description. In brief, radio-frequency signals intercepted by the antenna system, for example frequency modulation signals within the band of 84–97.5 megacycles, are applied to the converter 23 and therein converted to an intermediate-frequency signal of constant nominal frequency, for example 4.3 megacycles. This intermediate-frequency signal is further amplified and selected in the unit 24, limited in the unit 25, detected in the unit 26 to derive the audio-frequency modulation components which in turn are impressed upon the audio-frequency amplifier 27 and the loud speaker 28 for reproduction. While an automatic volume control circuit is not essential in this type of receiver, if desired an AVC bias may be derived from the unit 26 and applied to tubes of the stages 23, 24 and 25, as illustrated, to maintain the signal input to the frequency detector 26 within a narrow range for a wide range of received signal intensities.

Turning now to the heterodyne converter 23 embodying a feature of the invention, this converter comprises a first converting stage including a vacuum tube 30 having a control grid 30*a* and cathode 30*b* forming input electrodes and an anode 30*c* and cathode 30*b* forming output electrodes. The first converter stage includes a first resonant circuit 31 tuned to the frequency of the signal received by the antenna 20 to be converted. The first converter stage includes also a local oscillation second resonant circuit 32 and a third resonant circuit 33 tuned to a heterodyne frequency of the circuits 31 and 32, preferably to the difference in the frequencies of these two circuits. The circuits 31, 32 and 33 essentially comprise tunable systems of the type illustrated in Figs. 1*a* and 1*b* and described above, represented schematically by the elements 31*a*, 32*a* and 33*a*, respectively, and there may be connected across these elements trimmer or aligning condensers 31*b*, 32*b* and $32b_1$ in series, and 33*b*, respectively. The circuit 31 and a portion of the circuit 32 is connected in series between the input electrodes, as by connecting one terminal of the circuit 31 to the control grid 30*a* of tube 30 and connecting the other terminal thereof to one terminal of the circuit 32 and connecting the cathode 30*b* of the tube 30 to the junction of the condensers 32*b* and $32b_1$ of the circuit 32. The tunable circuit 33 and a portion of the tunable circuit 32 is similarly connected in series between the output electrodes of the tube 30 as by connecting one terminal of the circuit 33 to the anode 30*c* and the other terminal thereof to the opposite terminal of the tunable circuit 32. The adjustable elements of the tunable systems 31*a*, 32*a* and 33*a* are connected for uni-control adjustment by a mechanism represented schematically at 34, connected to be actuated by a manual tuning knob 35. The cathode of the tube 30 is provided with a suitable biasing circuit comprising a bias resistor 36 by-passed for radio-frequency signals by a condenser 37.

With the circuit connections described, signals of both heterodyne frequency and of local oscillation frequency appear between the output electrodes of the tube 30 and these signals are impressed through a coupling condenser 38 on a second converter stage including a vacuum tube 39. The tube 39 has a control grid 39*a* and a cathode 39*b* forming input electrodes and an anode 39*c* and a cathode 39*b* forming output electrodes. The tube as illustrated is a conventional pentode type including conventional screen and suppressor grid electrodes. The converter stage further includes a resonant circuit 40 coupled to the output electrodes of the tube 39 and tuned to the heterodyne frequency of the circuits 32 and 33; specifically the second intermediate-frequency signal is preferably of a frequency equal to the difference in the resonant frequencies of the circuits 32 and 33. The tuned circuit 40 is coupled to a similar circuit 41 and comprises therewith a conventional double-tuned intermediate-frequency selector. Suitable operating potential is applied to tube 30 from a source +B through a load resistor 42 and to the anode electrode of tube 39 from a source +B through a radio-frequency choke 43, while the screen potential of the tube 39 is supplied from the source +B through a voltage divider comprising resistors 44 and 45 in series and a radio-frequency choke 46.

Considering the operation of the converter 23 described, the tube 30 and the local oscillation circuit 32 comprises essentially a Hartley oscillator with its terminals connected between the grid 30*a* and anode 30*c* of the tube, the cathode of which is connected to an intermediate point of the capacitance arm of the tuned circuit. The frequency difference between the circuits 31 and 32 is ordinarily such that the circuit 31 offers a minimum impedance to the local oscillatory currents generated by the tube 30. Further, with this frequency relation, the capacitance 32*b* of the circuit 32 offers a substantially negligible impedance to the radio-frequency signals selected by the circuit 31. However, the frequencies of the circuits 32 and 33 will ordinarily be of the same order of magnitude so that each of these circuits constitutes an impedance to signal currents of a frequency of the other circuit. Therefore, since the tube 30 serves as a combined oscillator and detector, there appear across the circuit 33 and the portion of the circuit 32 coupled to its output electrodes, both heterodyne frequency signals and signals of the local oscillation frequency. These two signals are impressed upon the input electrodes of the tube 39 comprising the second detector stage, which is selected to have an approximately square-law transconductance characteristic. These two signals, therefore, are heterodyned in the tube 39 and the heterodyne frequencies appear in the output circuit of the tube 39. The circuits 40 and 41 are designed to select the difference-frequency heterodyne signals which comprise the second intermediate-frequency signals of the two-stage converter 23.

It is to be noted that all three of the tunable circuits 31, 32 and 33 are adjustably tuned by the tuning knob 35. The constants of the several tunable systems and of the trimmer condensers 31b, 32b, $32b_1$ and 33b are so selected that these circuits are tuned over the same range of frequencies so that, at all tuning adjustments, the frequency of the circuit 31 is equal to the sum of the frequencies of the circuits 32 and 33 and so that the difference between the frequencies of the circuits 32 and 33 remains constant and equal to the frequency of the circuits 40, 41, that is, to the second intermediate-frequency of the system.

The converter of the invention described has the advantage of providing a high conversion gain simultaneously with a large decrease in frequency from that of the received signal to the second intermediate-frequency signal with a minimum number of vacuum tube stages. At the same time the converter system provides extremely high image ratios, which are often difficult to procure in double-superheterodyne receivers.

While there has been described what is at present considered to be the preferred embodiment of the invention, it will be apparent to those skilled in the art that various changes and modifications may be made therein without departing from the spirit or scope of the invention.

I claim:

1. A resonant system tunable over a range of frequencies comprising, a concentric transmission line including a central conductor and a coaxial surrounding cylindrical conductor, a pair of axially-spaced supporting arms extending radially inward from said cylindrical conductor and supporting said central conductor, and a ferromagnetic core element proportioned substantially to fill the space between said conductors and slotted to clear said radial supporting arms, said core being axially adjustable to adjust the resonant frequency of the system.

2. A resonant system tunable over a range of frequencies comprising, a concentric transmission line including a central conductor and a coaxial surrounding cylindrical conductor, a pair of supporting means secured to the ends of said cylindrical conductor and extending inwardly therefrom for supporting said central conductor, and a core element proportioned substantially to fill the space between said conductors and slotted to clear one of said supporting means, said core being made of material having a permeability greater than that of air and being axially adjustable relative to said conductors to adjust the resonant frequency of the system.

3. A resonant system tuner over a range of frequencies comprising, a concentric transmission line including a central conductor and a coaxial surrounding cylindrical conductor, a pair of supporting means secured to the ends of said cylindrical conductor extending inwardly therefrom for supporting said central conductor, and a core element proportioned substantially to fill the space between said conductors and slotted to clear one of said supporting means, said core being made of material having a dielectric constant greater than that of air and being axially adjustable relative to said conductors to adjust the resonant frequency of the system.

4. A resonant system tuner over a range of frequencies comprising, a concentric transmission line including a central conductor and a coaxial surrounding cylindrical conductor, a supporting arm secured to said cylindrical conductor and extending inwardly therefrom for supporting said central conductor, and a core element proportioned substantially to fill the space between said conductors and slotted to clear said supporting arm, said core being made of material which has a permeability and a dielectric constant greater than that of air, said core being axially adjustable relative to said conductors to adjust the resonant frequency of the system.

5. A resonant system tuner over a range of frequencies comprising, a concentric transmission line including a central conductor and a coaxial surrounding cylindrical conductor, a supporting arm secured to said cylindrical conductor and extending inwardly therefrom for supporting said central conductor, and a ferromagnetic core element proportioned substantially to fill the space between said conductors and slotted to clear said supporting arm, said core being axially adjustable relative to said conductors to adjust the resonant frequency of the system.

6. A resonant system tuner over a range of frequencies comprising, a concentric transmission line including a central conductor and a coaxial surrounding cylindrical conductor, a supporting arm secured to said cylindrical conductor and extending inwardly therefrom for supporting said central conductor, a layer of insulating material on the inside surface of said cylindrical conductor, and a ferromagnetic core element proportioned substantially to fill the space between said conductors and slotted to clear said supporting arm, said core being axially adjustable relative to said conductors to adjust the resonant frequency of the system.

GUS W. WALLIN.

REFERENCES CITED

The following references are of record in the file of this patent:

UNITED STATES PATENTS

| Number | Name | Date |
|---|---|---|
| 2,157,855 | Koch | May 9, 1939 |
| 2,158,493 | Brailsford | May 16, 1939 |
| 2,286,428 | Mehler | June 16, 1942 |
| 2,297,516 | Walter | Sept. 29, 1942 |
| 2,392,664 | Gurewitsch | Jan. 8, 1946 |
| 2,402,948 | Carlson | July 2, 1946 |
| 2,403,252 | Wheeler | July 2, 1946 |